Figure 1:
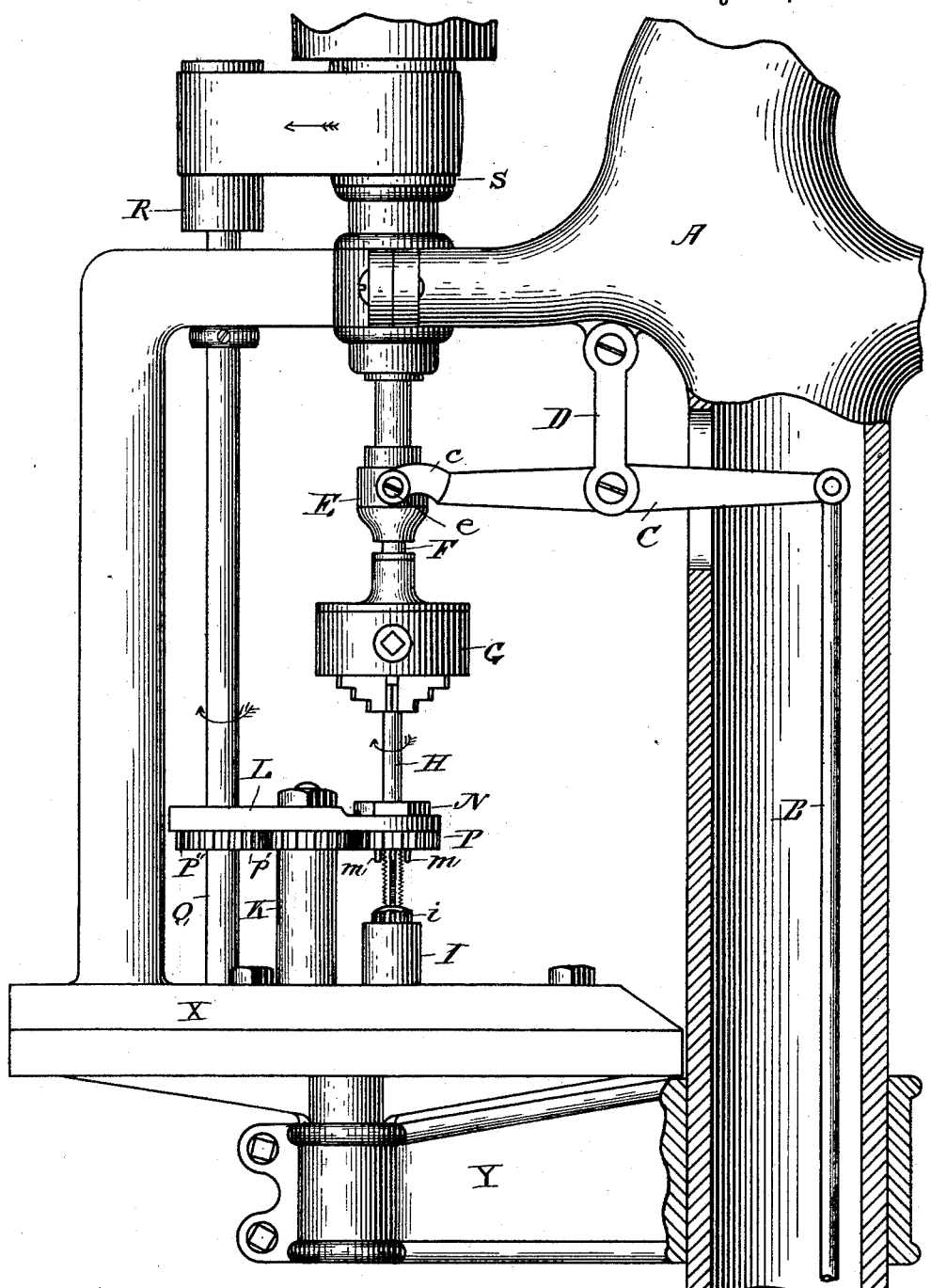

(No Model.) 2 Sheets—Sheet 2.

W. D. PUTNAM.
NUT TAPPING MACHINE.

No. 497,892. Patented May 23, 1893.

WITNESSES
A. J. Burrows
J. J. Cunningham

INVENTOR
Waldo D. Putnam.

UNITED STATES PATENT OFFICE.

WALDO D. PUTNAM, OF BOSTON, MASSACHUSETTS, ASSIGNOR OF ONE-HALF TO WILLIAM H. WILKINSON, OF SAME PLACE.

NUT-TAPPING MACHINE.

SPECIFICATION forming part of Letters Patent No. 497,892, dated May 23, 1893.

Application filed July 18, 1892. Serial No. 440,321. (No model.)

*To all whom it may concern.*

Be it known that I, WALDO D. PUTNAM, of Boston, in the county of Suffolk and State of Massachusetts, have invented certain new and useful Improvements in Nut-Tapping Machines, of which the following description, together with the accompanying drawings, is a specification.

In nut-tapping machines heretofore in use, either the machine has been reversed in motion at each tapping operation, so as to unscrew the tapping-tool from the nut, or a number of nuts have been tapped and each slipped up over the shank or smooth portion of the tapping-tool until it was filled. Then the tool was removed, the nuts slipped off and the tool replaced in the chuck. In each of these operations considerable time was consumed in removing the nuts after they were tapped.

My invention consists in combining with the tapping tool, mechanism which will engage the nut after it has been tapped and during the interval of raising the tool to insert a new blank and returning it to perform the tapping operation, give to the nut previously tapped, a speed of rotation enough greater than that of the tapping tool and in the same direction to screw the nut off from the tap. A simple and effective means for accomplishing this is shown in the drawings, wherein—

Figure 2:
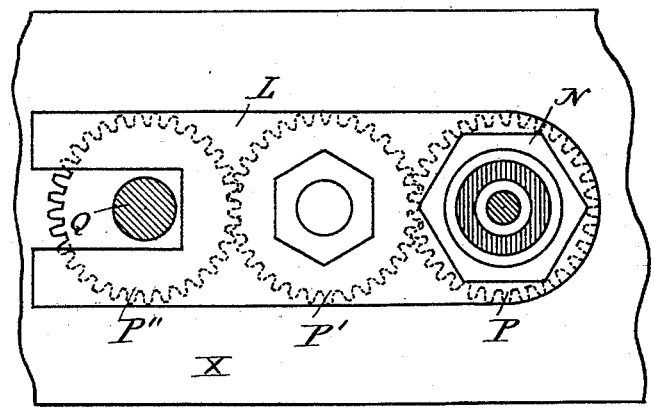
Figure 3:
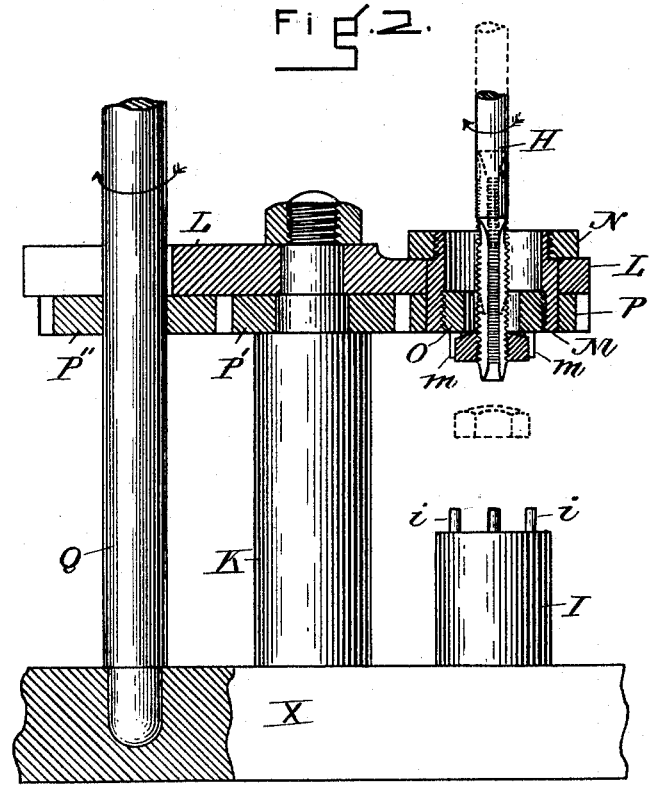

Figure 1, is an elevation of a portion of a nut tapping machine with my improved nut-removing mechanism attached thereto. Fig. 2, is a plan of the gears by which the removing device is rotated. Fig. 3, is an elevation of the removing mechanism with the tapping-tool raised to the position where the removing device has engaged the nut already tapped, and by its rapid rotation will turn it from the tap and drop it as illustrated in dotted lines.

Referring to the drawings, A represents a portion of the frame of the nut-tapping machine, a portion of the hollow standard being in section to expose the rod B extending from the tap raising lever C, to a foot treadle below.

The lever C is hung to the frame of the machine by a link D. One end of the lever C is forked at $c$ and pivoted at $e$ to a collar E on the spindle F, by which the tool chuck G, and tapping-tool H are supported and rotated.

I is a rest on which the nut blanks are placed to be tapped; in the top of the rest are projecting pins $i$, which prevent the blanks from turning while being tapped.

Upon a post K, an arm L is supported and in one end thereof a hole is made to receive the nut-removing device, which consists of a short tube M, made to fit loosely in said hole in the arm L, where it is held by a nut N, screwed upon the upper end of the said tube. From the lower end of the tube M, several pins $m$, project. These may be inserted in the end of the tube M, or in a separate ring O, screwed into the lower end of the tube as illustrated in the drawings.

The nut-removing device illustrated, is rotated by a train of gears P, P', P''. P is secured to the lower end of the tube M, P' runs upon a bearing formed on the top of the post K and P'' is secured upon a shaft Q, which has a lower bearing in the bed X of the machine which is supported upon a bracket Y, and an upper bearing in the frame of the machine.

In order to give the nut-removing device a speed of rotation greater than that of the tapping tool, a pulley R may be placed upon the shaft Q, smaller than the one S upon the shaft which drives the tapping tool, and the two connected by a belt. Thus when the shaft Q is turned, the removing device M, will be rotated at the same speed as that shaft, through the train of gears P'', P', P.

It will be readily understood that the speed of the removing device may be varied as desired, either by varying the size of the pulleys R, S, of the relative sizes of the gears P, P', P''. Likewise instead of these gears, friction wheels may be used, or the middle wheel may be omitted, and sprocket wheels substituted for P and P'' and connected by a chain. The particular means for communicating motion to the removing device is not material, so long as it is given a speed greater than that of the tapping-tool.

In the use of my improvements the machine can be kept constantly running without any reverse motion to withdraw the tapped nuts, or stopping to remove the tap for that purpose.

The operation of the machine with my improvements is as follows: After the machine is started, a nut blank is placed upon the rest I, within the pins i, the rod B is forced upward, which by means of the lever C, pushes the tapping tool down to and through the nut until a full thread has been cut in it. The tap H is then raised to the position shown in Fig. 3, the fingers m projecting from the lower end of the removing device, catch the angles of the outside of the nut and twirl it around at a greater speed than that of the tapping tool, thus screwing the nut off from the tap and allowing the nut to drop as illustrated in dotted lines Fig. 3. By this means the tapped nut is automatically removed during the time required to insert a new blank in the machine, which effects a very great saving of time in the operation and greatly increases the capacity of the machine.

I claim—

1. In a nut-tapping machine, the combination with a tapping-tool of a nut-removing device which has a speed of rotation greater than that of the tapping tool, but in the same direction, and which engages with the tapped nut when the tapping tool is raised substantially as described.

2. In a nut-tapping machine, the combination of a tapping tool, and annular nut-removing device which surrounds the said tool and rotates at a speed greater than that of the said tool, whereby when the tool is raised after tapping a nut, the said device will remove the nut from the tool in the manner substantially as described.

3. In a nut-tapping machine, the combination of a tapping-tool, a nut removing device which constantly rotates independently of the said tool, and at greater speed in the same direction, and a nut socket upon said device to receive the nut when the tapping tool is raised and unscrew it therefrom, substantially as described.

WALDO D. PUTNAM.

Witnesses:
A. J. BURROWS,
T. J. CUNNINGHAM.